June 17, 1969  F. DAMBRINE ET AL  3,450,263

FILTER ELEMENT

Filed April 28, 1967

INVENTORS.
FRANCIS DAMBRINE
JEAN CLAUDE GIORGI

BY Kurt Kelman

AGENT

United States Patent Office 3,450,263
Patented June 17, 1969

3,450,263
FILTER ELEMENT
Francis Dambrine, Marcq-en-Baroeul, and Jean Claude Giorgi, Lille, France, assignors to Societe Fives Lille Cail, Paris, France
Filed Apr. 28, 1967, Ser. No. 634,548
Claims priority, application France, Apr. 29, 1966, 59,633
Int. Cl. B01d 35/16
U.S. Cl. 210—108
8 Claims

ABSTRACT OF THE DISCLOSURE

A suction filter element with cake discharge by backwashing of the filtered liquid in which a pliable filter medium is supported on a perforated casing of the element, and cake discharge is facilitated by tensioning of the filter medium when two portions of the casing are moved apart under the pressure of the backwashing liquid.

BACKGROUND OF THE INVENTION

This invention relates to filter elements for pressure or suction filtration, and particularly to the removal of the filter cake which accumulates on such elements during filtration.

It is known to cause a slurry to flow under pressure through a porous filter medium backed by a more rigid perforated support, and to dislodge the cake from the pressure medium by causing a liquid, such as the filtrate, to flow under pressure through the medium in a direction opposite to the direction of flow during filtration. It is not always possible adequately to remove the cake by such backwashing, and scrapers or other mechanical devices must be used if it is desired to remove the cake practically completely after each filtration step.

It is an object of the invention to improve the removal of the cake from the filter medium without the use of scrapers or similar mechanical implements.

SUMMARY OF THE INVENTION

According to the invention, a filter element of the described type is provided with a mechanism which tensions the filter medium in a direction transverse of liquid flow through the medium for removal of the filter cake, and which is operated by the pressure of the backwashing liquid. The resulting relative movement of the pliable filter medium and of the relatively stiff filter cake causes the cake to break loose from the filter medium so that it is readily washed away by the liquid discharged through the porous medium.

Other features and many of the attendant advantages of this invention will be readily appreciated as the same becomes better understood by reference to the following detailed description of preferred embodiments when considered in connection with the accompanying drawing.

DESCRIPTION OF THE PREFERRED EMBODIMENTS

Figure 1:
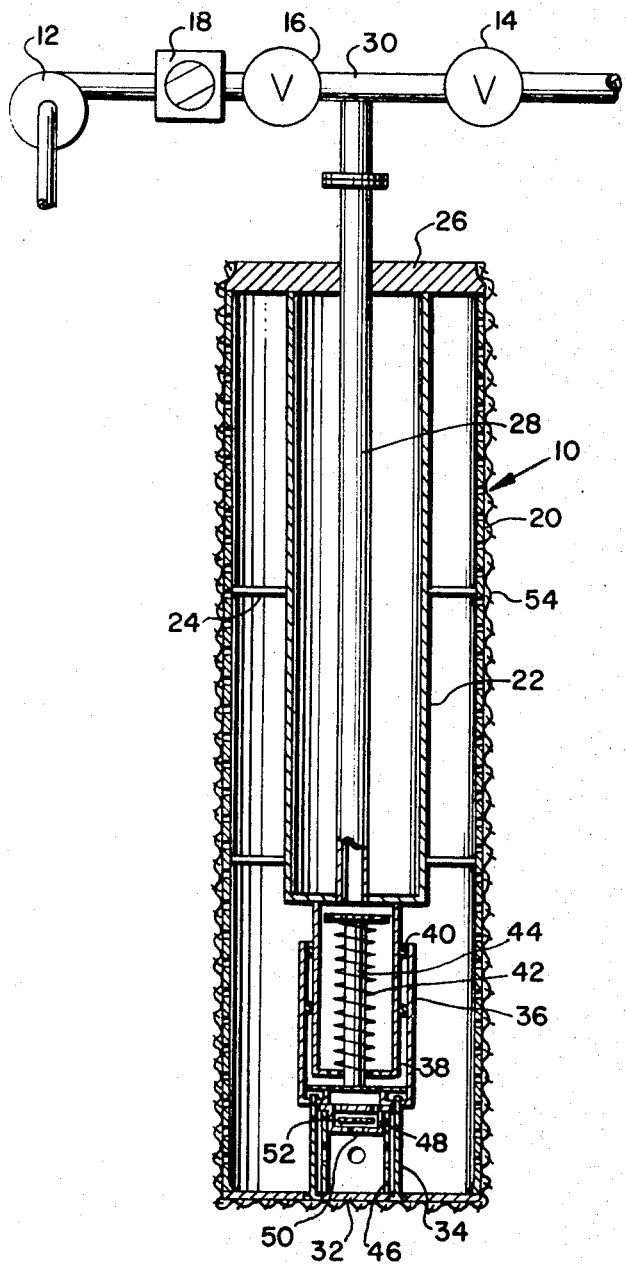
FIGURE 1 shows a filter element of the invention and associated auxiliary equipment in an elevational, partly sectional view.

Referring now to the drawing in detail, and initially to FIGURE 1, there is shown a filter element 10 flanged to a T-fitting 30. The discharge pipe of a centrifugal pump 12 is connected with one branch of the fitting 30 and is equipped with a shut-off valve 16 and a rotary plug valve 18. The other branch of the fitting 30 is provided with a shut-off valve 14.

The supporting structure of the filter element 10 includes a perforated cylindrical sheet metal casing 20 in which a tube 22 is coaxially mounted by means of radial arms 24 and a fixed disc 26 which closes one end of the casing 20. A pipe 28 is coaxially mounted in the disc 26 and the pipe 22, and provides the flanged connection between the filter element 10 and the T-fitting 30. The space between the tube 22 and the pipe 28 is sealed and merely serves the purpose of reducing the free volume of the cavity within the casing 20.

The other end of the casing 20 is normally closed by a disc 32. Rods 34 fixedly fastened on the disc 32 support a cup-shaped cylinder 36 which is movably sealed to a hollow plunger 38 by interposed sealing rings 40. A helical compression spring 42 is interposed in the plunger 38 between the bottom of the latter and the enlarged head of a bar 44 fixedly mounted on the bottom of the cylinder 36 and projecting into the plunger 38. The spring 42 normally holds the disc 32 in axially abutting engagement with the cylindrical wall of the casing 20.

The hollow interior of the plunger 38 and the cylinder 36 form a chamber which is permanently connected with the T-fitting 30 by passages in the head of the bar 44 and by the pipe 28. Another chamber of annular cross section is formed between the casing 20 and the tube 22, and communicates with the expandable chamber of the cylinder 36 and plunger 38 through a valve 48 mounted between the disc 32 and the cylinder 36 by means of a perforated tube 46. A valve disc 52 is normally seated on a valve seat 50 under its own weight which may be reinforced by a conventional valve spring, not shown. A small throttling passage through the disc 52 has a flow section which is but a small fraction of the valve opening in the seat 50.

A bag 54 envelops the casing 20. Its closed bottom hugs the disc 32 under the resilient force of the bag. The open top of the bag 54 is sealed to the rim of the disc 26. The bag consists of duck or any other conventional porous filtering medium.

The aforedescribed filter element is operated as follows:

The filter element is immersed in the slurry to be filtered, the valve 16 is closed, and the valve 14 is opened. If the slurry and the filter element are enclosed in a pressure vessel, and the valve 14 is open to the atmosphere, the slurry is driven against the bag 54 of the filter medium under the prevailing pressure, and the solids are retained on the filter medium while the liquid flows through the medium, the perforated face portion of the casing 20, and into the chamber within the casing contiguously adjacent thte perforations in the same. The valve 14, of course, may also be connected to a suction pump in a conventional manner.

During its flow through the conduit provided by the tube 46, the liquid lifts the valve disc 52 from its seat 50, and further flows through the second chamber within the cylinder 36 and the pipe 28 out of the filter element. A cake of solids is built up on the exposed outer face of the bag 54.

When the cake reaches the desired maximum thickness, the valve 14 is closed, the filter element carrying the cake may be transferred to another vessel, if so desired, the pump is connected to a non-illustrated supply of backwashing liquid and started, and the valves 16, 18 are opened. The backwashing liquid discharged under pressure from the pump 12 flows into the chamber within the cylinder 36 and through the throttling passage in the valve disc 52 which is firmly held against its seat 50 by the pressure of the pumped liquid. The liquid, usually a portion of the filtrate, ultimately flows outwardly through the perforated face of the casing 20 and the porous filter medium 54.

The pressure differential which develops between the ends of the throttling passage in the disc 52 causes expansion of the chamber in the cylinder 36. The plunger 38 and cylinder 36 are moved axially apart, and the discs 26, 32 respectively move with them, thereby axially tensioning the bag 54 of filter medium. The resulting resilient deformation of the bag causes relative movement of the bag and of the filter cake, and facilitates removal of the filter cake from the filter medium.

The tension in the bag 54 may be controlled by setting the valve 18, and it may be varied during the backwashing operation, if so desired, by alternatingly opening and closing the valve 18 as the nature and consistency of the cake of solids may require.

The nature of the filter medium 54 also is taken into consideration when determining the mode of operation of the valve 18. When the medium is not very resilient, the relative movement of the discs 26, 32 should be rapid, and the discs should oscillate relative to each other at relatively high frequency during backwashing. If the optimum frequency cannot be achieved when the plug of the valve 18 is rotated by a motor, a different type of valve may be employed. When the filter medium can be deformed resiliently to a relatively great extent, the valve 18 need not be opened and closed frequently during backwashing, but provisions should be made for relatively large displacement of the movable disc 32 relative to the fixed disc 26.

Figure 2:
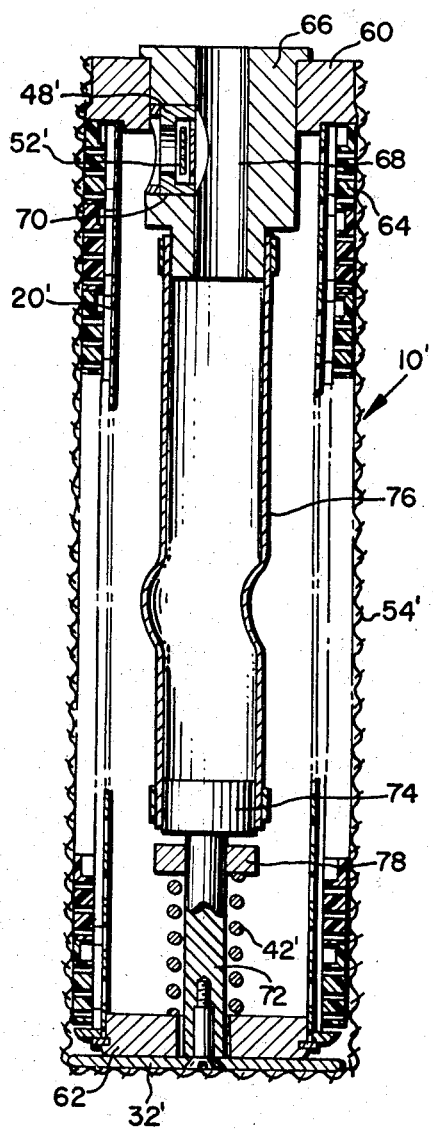
FIGURE 2 shows a modified filter element in a view corresponding to that of FIGURE 1.

The modified filter element 10' shown in FIGURE 2 has a perforated supporting tube 20' whose axial ends are respectively fastened to a ring 60 and a disc 62. Perforated polypropylene rings 64 cover the tube 20' and support a bag-shaped filter medium 54' whose free rim is fastened to the ring 60.

A nipple 66 is coaxially and fixedly sealed in the ring 66. It has an axial bore 68 and a radial bore 70 which communicates with the bore 68. A valve 48' substantially identical with the afore-described valve 48 is arranged in the bore 70. Its perforated valve disc 52' is normally held against its seat by a non-illustrated spring.

A cylindrical rod 72 is slidably received in an axial bore of the disc 62. A movable disc 32' is fixedly attached to the rod 72 and is arranged between the disc 62 and the bottom of the filter medium 54'. A helical compression spring 42' coiled about the rod 72 abuts against the inner face of the disc 62 and against a fixed but adjustable collar 78 on the rod 72, thereby normally holding the disc 32' against the disc 62.

A flexible hose or tube 76 is sealed to the enlarged head 74 of the rod 72 and to the inner end of the nipple 66. The hose 76 is normally bent or buckled by the force of the spring 42', as is shown in FIGURE 2. Its interior is connected by the nipple 66 to a suction pump and a pressure pump in a manner evident from FIGURE 1, but not shown in FIGURE 2.

The apparatus of FIGURE 2 operates in the same manner as described above with reference to FIGURE 1. When the pressure in the tube 20' is lower than that outside the filter medium 54', a slurry outside the filter element 10' is drawn toward the filter medium 54' which retains the solids while the liquid component passes through the rings 64 and the perforations in the tube 20' into the chamber between the hose 76 and the tube 20'. During its further flow through the bore 70, it lifts the valve disc 52' from its seat and is ultimately discharged from the bore 68.

During backwashing, a liquid admitted under pressure to the hose 76 flows outwardly through the bore 70, thereby pressing the valve disc 52' against its seat. The throttling passage in the valve disc causes the internal pressure in the hose 76 to exceed the pressure in the outer chamber of the filter element, the rod 72 is moved outwardly of the filter element 10', whereby the hose 76 is straightened, and the bag of filter medium 54' is stretched. A filter cake deposited on the medium 54' during the filtering step is broken loose and is readily washed away by the outwardly discharged liquid.

Numerous other modifications of the apparatus will readily suggest themselves to those skilled in the art. The piston and plunger arrangement shown in FIGURE 1 may be replaced by a diaphragm which connects the portions of the suppporting structure capable of relative axial movement. The precise location of the valve 48, 48' is immaterial to its function as long as it connects the two chambers of the filter element. If the larger flow section provided by the open valve is not required during the filtration step, the valve disc 52, 52' may be replaced by a fixed throttling plate to provide the pressure differential between the two chambers, whereon the illustrated embodiments rely for moving two portions of the supporting structure relative to each other, and for thereby tensioning the filter medium 54, 54' in a direction transverse to the direction of liquid flow therethrough.

It should be understood, therefore, that the foregoing disclosure relates only to preferred embodiments of the invention, and that it is intended to cover all changes and modifications of the examples of the invention herein chosen for the purpose of the disclosure which do not constitute departures from the spirit and scope of the invention set forth in the appended claims.

What is claimed is:

1. In a filter element, in combination:
   (a) a support having a substantially rigid, perforated face portion and a portion movable relative to said face portion;
   (b) a porous filter medium of pliable material having respective portions secured to said face portion and to said movable portion, one of said portions of said medium being superposed on said face portion;
   (c) first pressure means for causing portions of a slurry to flow in sequence through said medium and the perforations of said face portion, whereby solids from said slurry are retained on said medium to form a cake;
   (d) second pressure means for causing a backwashing liquid to flow in sequence through perforations of said face portion and said medium, whereby a retained cake is discharged from said medium; and
   (e) tensioning means responsive to the pressure of a backwashing liquid driven by said second pressure means for tensioning said medium in a direction transverse to the direction of the flow of said backwashing liquid through said medium,
      (1) said tensioning means including moving means for moving said portions of the support relative to each other in said transverse direction.

2. In a filter element as set forth in claim 1, said face portion being tubular and having an axis, said movable portion including a disc, said moving means being adapted to move said disc axially toward and away from a position in which said disc closes an axial end of said tubular face portion, said filter medium including a bag member enveloping said support and having a closed bottom covering said disc, said support enclosing a first chamber communicating with said perforations, said first pressure means including means for releasing fluid from said first chamber, two mmebers respectively secured to said tubular portion and to said disc for movement therewith, said two members defining a second chamber, said second chamber expanding and contracting during said movement, a conduit connecting said chambers, throttling means in said conduit for throttling flow of fluid therethrough, and means for connecting said second chamber to said second presssure means.

3. In a filter element as set forth in claim 1, said support including means defining a first chamber contiguously adjacent said face portion and communicating with the perforations of the latter, said tensioning means including a second chamber interposed between said portions of said support and expandable in said transverse direction, a first conduit connecting said chambers to each other, throttling means in said first conduit, and a second conduit connecting said second chamber to said second pressure means for flow of said backwashing liquid from said second pressure means to said second chamber, said first conduit, and said first chamber, whereby said second chamber expands under the pressure of said backwashing liquid and said portions of the support are moved relative to each other.

4. In a filter element as set forth in claim 3, first valve means interposed between said second conduit and said first pressure means, and second valve means interposed between said second conduit and said second pressure means.

5. In a filter element as set forth in claim 3, said throttling means including valve means for reducing the flow section of said first conduit in response to flow of liquid in said conduit in a direction from said second chamber toward said first chamber, and for increasing said flow section in response to flow of liquid from said first chamber toward said second chamber.

6. In a filter element as set forth in claim 3, a cylinder member and a plunger member sealingly movable in said cylinder member, said members defining said second chamber and being respectively fixedly fastened to said portions of said support.

7. In a filter element as set forth in claim 6, said throttling means including a throttling valve mounted on one of said members and responsive to flow of liquid through said first conduit in one direction for reducing the effective flow section of the conduit.

8. In a filter element as set forth in claim 3, a flexible hose member having respective portions fastened to said portions of said support and constituting said second chamber.

References Cited

UNITED STATES PATENTS

| | | | |
|---|---|---|---|
| 2,046,770 | 7/1936 | Coberly et al. | 210—108 |
| 2,460,084 | 1/1949 | Hebo | 210—356 |
| 2,569,748 | 10/1951 | De Grave | 210—108 |

FOREIGN PATENTS

| | | |
|---|---|---|
| 727,983 | 2/1966 | Canada. |

REUBEN FRIEDMAN, *Primary Examiner.*

JOHN ADEE, *Assistant Examiner.*

U.S. Cl. X.R.

210—356